(12) United States Patent
Blumenfeld et al.

(10) Patent No.: US 9,898,339 B2
(45) Date of Patent: Feb. 20, 2018

(54) METER READING DATA VALIDATION

(71) Applicant: Itron, Inc., Liberty Lake, WA (US)

(72) Inventors: Symen Blumenfeld, Raleigh, NC (US); Ricardo Luis Lopez, Raleigh, NC (US); Stephen Craig Totty, Raleigh, NC (US)

(73) Assignee: Itron, Inc., Liberty Lake, WA (US)

( * ) Notice: Subject to any disclaimer, the term of this patent is extended or adjusted under 35 U.S.C. 154(b) by 412 days.

(21) Appl. No.: 13/797,652

(22) Filed: Mar. 12, 2013

(65) Prior Publication Data

US 2014/0282550 A1 Sep. 18, 2014

(51) Int. Cl.
G06F 9/46 (2006.01)
G06F 9/50 (2006.01)
G01D 4/00 (2006.01)

(52) U.S. Cl.
CPC .......... G06F 9/5027 (2013.01); G01D 4/002 (2013.01); G06F 2209/506 (2013.01); Y02B 60/142 (2013.01); Y02B 90/241 (2013.01); Y04S 20/32 (2013.01)

(58) Field of Classification Search
None
See application file for complete search history.

(56) References Cited

U.S. PATENT DOCUMENTS

| 8,073,974 B2 * | 12/2011 | Rapp | G06F 9/54 709/247 |
|---|---|---|---|
| 2006/0012491 A1 * | 1/2006 | Mahowald | H04Q 9/00 340/870.02 |
| 2006/0123282 A1 * | 6/2006 | Gouldey | G06F 9/54 714/718 |
| 2010/0117856 A1 * | 5/2010 | Sonderegger | G01D 4/02 340/870.02 |
| 2011/0167433 A1 * | 7/2011 | Appelbaum et al. | 719/318 |
| 2011/0169659 A1 * | 7/2011 | Dalla | G01D 4/006 340/870.02 |
| 2012/0307624 A1 * | 12/2012 | Vasseur et al. | 370/221 |
| 2013/0057413 A1 * | 3/2013 | Tamarkin | G01D 4/004 340/870.02 |

OTHER PUBLICATIONS

The PCT Search Report and Written Opinion dated Apr. 28, 2016 for PCT application No. PCT/US14/24801, 7 pages.

* cited by examiner

*Primary Examiner* — Umut Onat
(74) *Attorney, Agent, or Firm* — Lee & Hayes, PLLC (57) ABSTRACT

A meter data management (MDM) system processes imported blocks of utility data collected from a plurality of utility meters, sensors, and/or control devices by using independent parallel pipelines associated with differing processing requirements of the data blocks. The MDM system determines processing requirements for each of the imported data blocks, selects one of the pipelines that matches the determined processing requirements for each of the imported data blocks, and directs the data blocks to the selected one of the pipelines for processing. The pipelines may include a validation pipeline for validation processing, an estimation pipeline for estimation processing and a work item pipeline for work item processing.

20 Claims, 4 Drawing Sheets

METER READING DATA VALIDATION

BACKGROUND

Utility service providers often rely on multiple systems and data stores to process large volumes of raw register and interval data. Such data may be produced by utility meters, sensors, and/or control devices (collectively "utility data collection devices"), such as in an automatic meter reading (AMR) environment and/or an advanced metering infrastructure (AMI).

The volume of interval data produced by AMI and AMR systems assists utilities to evaluate potential problems, analyze consumption statistics and offer customers advanced rates. However, frequent collection of smaller increments of customer data increases the potential for confusion and/or bad data. This is unfortunate because customers and partners need quality utility data to be available as soon as possible. Therefore, reducing latency in the conversion of raw data into quality accurate and complete information is essential for utilities, customers and partners to use for analysis and billing.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Utility data, such as data collected from utility meters, sensors, and/or control devices (collectively "utility data collection devices" (UDCDs)) of an advanced metering infrastructure (AMI) and/or automatic meter reading (AMR) system, has the potential to be inaccurate, incomplete, or otherwise deficient. Utility service providers (i.e., utility companies) can address potential deficiencies of the data by importing the data to a centralized meter data management (MDM) system for batch processing. As an example, utility data may be provided to the MDM system directly from utility data collection devices of an AMI, but more commonly, utility data is provided from one or more collection systems (e.g., head-end systems that may pre-process the utility data), from mobile collection systems (e.g., mobile collection devices that may be part of an AMR system), manually (e.g., via handheld devices or physical meter readings), or the like.

This application describes techniques to perform, in a parallel fashion, the validation, estimation and work item assignment of utility data collected from utility data collection devices as the utility data is imported (e.g., provided) to an MDM system. Upon import of blocks of utility data, the MDM system verifies utility data that is valid, and generates valid data for utility data that is not valid. This assures that quality utility data is made available rapidly for purposes such as billing or analysis. As an example, for imported blocks of utility data collected from multiple utility data collection devices, an enhanced MDM system selects a pipeline of multiple independent pipelines operating in parallel to perform validation, estimation or work item assignment for each imported block of utility data. Validation of data may include processing to determine if the data block is valid. Estimation of data may include estimating data missing from the data block or data that is outside of expected ranges. Work item assignment of data may include manual processing to resolve data outside of expected ranges determined to be unsuitable for estimation.

An enhanced MDM system may use a rule-based algorithm to quickly determine processing requirements for each imported data block, and to select an appropriate pipeline that matches the processing requirements for each imported data block. Based on the determined processing requirements, the enhanced MDM system may direct each imported data block to an associated independent validation pipeline (e.g., to determine if the data block is actually valid), an independent estimation pipeline (e.g., to estimate data missing from the data block or data that is outside of expected ranges) or an independent work item pipeline (e.g., to resolve data outside of expected ranges determined to be unsuitable for estimation). The enhanced MDM system may process responses and/or results of pipeline processing for each processed data block as they become available.

The enhanced MDM system may process imported data blocks in parallel, such that for a group of imported data blocks, a first subset of data blocks of the group may be directed to a validation pipeline, a second subset of data blocks of the group may be directed to an estimation pipeline and a third subset of data blocks of the group may be directed to a work item pipeline. All three pipelines may operate independently, simultaneously and in parallel. A rule-based switching fabric, or the like, may be used to feed each independent pipeline with imported utility data. Moreover, each independent pipeline may process blocks of utility data in parallel, and provide utility data to corresponding modules that may be configured to implement rule-based processing associated with each pipeline.

Various different types of collected utility data may be categorized by different "channels." As an example, data from a particular type of gas meter may be associated with a first channel, data from a first type of power meter may be associated with a second channel, data from a second type of power meter may be associated with a third channel, data from a water meter may be associated with a fourth channel, and the like. As another example, different channels may be associated with various "flows" of utility data occurring, for example, during peak demand time or during off-peak demand time. Different channels may also be associated with customers having special discount or bonus agreements, with customers having alternate energy resources (e.g., wind turbines, solar panels, hydrogen fuel cells, hydroelectric generators, geothermal generators, etc.) that supply power to the power grid, and numerous various other factors.

Data from utility data collection devices may be gathered by associated collection systems that understand a protocol or data format of associated utility data collection devices. A collection system may obtain raw data, such as periodically generated interval data and/or register data from a utility data collection device, and configure the periodic data into data items in a data block associated with a measurement period, such as an hour, day, month, or the like, for the utility data collection device. A collection system may add data (e.g., metadata) to the data block to help an MDM system determine a channel associated with the data block. Thus, utility data provided to an MDM system by a collection system may contain data (e.g., in a data block header) that can be used to identify a channel associated with the data block.

An enhanced MDM system may be configured to determine all channels associated with imported utility data, and to pre-load all rules or rule sets associated with all of the different channels that are processed by the MDM system. This obviates a need to fetch one or more rules or rule sets on a channel by channel basis as data blocks are imported by the MDM system. The rules may be pre-loaded into memory of the MDM system and may be configured to create a rule hierarchy.

The rule hierarchy may operate such that an imported data block of a particular channel need only be directed to, applied to, or associated with, a correct "branch" or "door" (e.g., entry point) of the rule hierarchy associated with the channel of the data block, to have appropriate rules applied to the data block. Each "branch" or "door" of the rule hierarchy may be associated with a single channel, or multiple different channels. An enhanced MDM system may easily determine channels associated with imported data blocks and use the rule hierarchy to apply an appropriate rule or rule set associated with the channels at the time of data block import. Associating rules, rule sets, branches or doors (e.g., entry points) of a rule hierarchy, or the like, with channels greatly simplifies rule based processing of data blocks. This is because data blocks do not have to be individually analyzed to determine appropriate rules. Additionally, rules that are not associated with the channels are not applied to corresponding data blocks. An enhanced MDM system may use a Universal Calculation Engine (UCE) to determine and/or apply at least a subset of rules associated with corresponding channels during data import.

The enhanced MDM system may flag data blocks that are determined to be valid, and estimated data blocks that pass revalidation, as valid. The enhanced MDM system may flag data blocks with discrepancies that are too large to safely process automatically (e.g., too much data missing or data outside of a pre-specified missing item threshold where data estimation is not suitable) for work queue processing, where manual intervention may be required. Data blocks may be flagged with various status information or instructions that may be used to determine how data blocks are to be processed. Data blocks flagged as valid may be passed to a queue manager to update a queue of available valid data suitable for analysis and/or billing purposes.

As an example, validation rules and estimation algorithms used in this process may be separately configurable for each channel and/or groups of channels. Separate configuration ensures that the rules and algorithms are appropriate for a class of service and a specific unit of measure being processed. Estimation algorithms may use historical data having a time frame that may be flexibly defined. Validation rules and/or estimation algorithms may be partially or wholly integrated with the rule hierarchy or separate from the rule hierarchy.

A variety of networking technologies may be used to provide data from utility data collection devices to a corresponding collection system (e.g., head-end system) which may pre-process the utility data prior to processing by an enhanced MDM system. Various wired and wireless systems may be employed that incorporate packetized data that may arrive out of sequence or order. As an example, digital radios that are part of a low power and lossy network (LLN) or other radio network type, power-line communication systems, cell phone systems, wired systems, or the like, may be employed to provide data from numerous utility data collection devices to collection systems for processing by an enhanced MDM system.

Using the techniques described herein, utility data from a multitude of utility data collection devices may be rapidly assured to be of billable and/or analytical quality, or flagged to indicate why it is not. By running various processes in parallel on real-time imported utility data from utility data collection devices, latency of obtaining quality data is kept to a minimum. Quality data may become available for billing and/or analysis before batch processing of all imported utility data is completed.

Multiple and varied implementations and embodiments are described below, beginning with an "Example Environment," followed by "Example Utility Data Blocks," "Example Enhanced MDM Processing," and "Example Methods of Operation." Finally, the application concludes with a brief "Conclusion." This Overview and the following sections, including the section headings, are merely illustrative implementations and embodiments and should not be construed to limit the scope of the claims.

Example Environment

Figure 1:
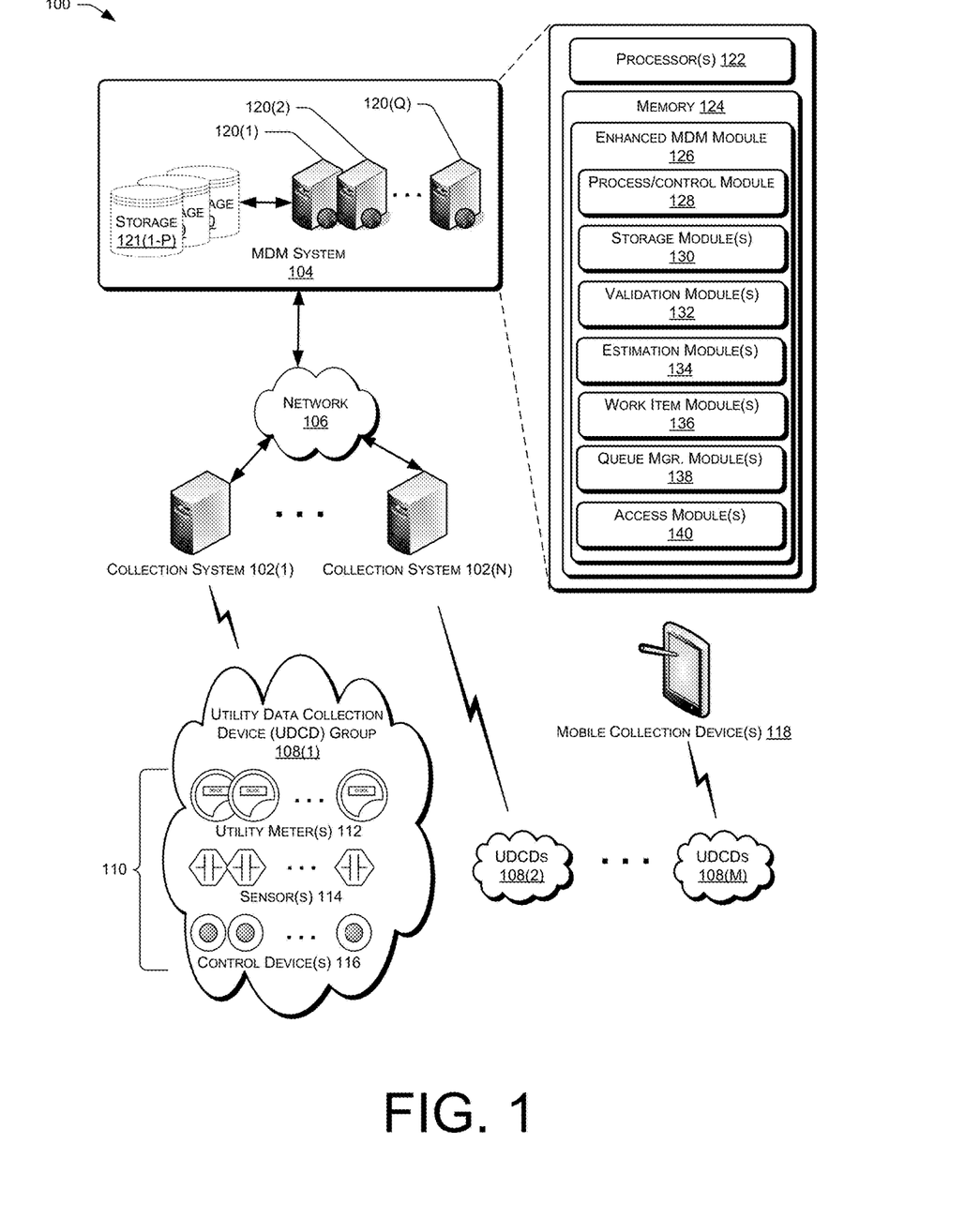
FIG. 1 is a schematic diagram of an example architecture employing a meter data management (MDM) system, collection systems and utility data collection devices.

FIG. 1 is a schematic diagram of example architecture 100 configured to implement utility data validation. The architecture 100 includes a plurality of collection systems 102(1) . . . 102(N) (collectively referred to as 102) communicatively coupled to a centralized meter data management (MDM) system 104 of a utility service provider. Collection systems 102 are shown in FIG. 1 as coupled to MDM system 104 via network 106, however, one or more of collection systems 102 may be collocated with MDM system 104. Furthermore, network 106 may include multiple networks of different types (e.g., wired, wireless, cellular, etc.).

Collection systems 102 may perform at least some processing of data (e.g., raw data) from utility data collection devices. As an example, collection system 102 may convert raw pulse data from a utility meter into consumption values, and include those values along with a meter model or a meter identifier (e.g., channel) into a data block for processing by MDM system 104. FIG. 1 shows utility data collection device groups 108(1)-108(M) communicatively coupled to collection systems 102. Each utility data collection device group 108(1)-108(M) includes utility data collection devices (UDCDs) 110, as shown in utility data collection device group 108(1). For ease of illustration, only group 108(1) is shown in detail. However, the other groups 108(2)-108(M) may likewise include any number of utility data collection devices 110. Various collection systems 102 understand one or more protocols of various utility data collection devices 110. Utility data collection devices 110 may include utility meters 112 (e.g., water, gas, and/or electricity consumption meters), sensors 114, and/or control devices 116. Some utility data collection devices 110 may be configured to provide utility data directly to MDM system 104, thus bypassing collection systems 102.

Collection systems 102 may be in one- or two-way communication with the utility data collection devices 110 in their respective groups 108(1)-108(M). Each group 108 may be associated with any number of collection systems 102 and utility data collection devices 110. For example, each group 108 may include at least one collection system 102 and hundreds or even thousands of utility data collection devices 110.

Mobile collection device(s) 118 may be used to collect data from various utility data collection devices 110 in one or more of UDCD groups 108(1)-108(M). Mobile collection device(s) 118 may be associated with an automatic meter reading (AMR) system such that they can wirelessly retrieve data from associated UDCDs 110. As an example, mobile collection device(s) 118 may include mobile or handheld devices configured to read utility data collection devices 110 to obtain utility data upon request, and provide the utility data to MDM system 104 wirelessly, via network 106, via a file download to MDM system 104, or by other data transfer means. Mobile collection device(s) 118 may be configured to perform some or all of the functionality of one or more of collection systems 102, or may provide utility data to a collection system 102 for processing.

MDM system 104 may include one or more servers 120(1)-120(Q) (collectively referred to as 120) arranged in a cluster or as a server farm. As shown in FIG. 1, servers 120(1)-120(Q) are coupled to storage devices 121(1)-121(P), which provide for data storage and retrieval. Other server architectures may also be used to implement MDM system 104.

MDM system 104 includes one or more processors 122 communicatively coupled to memory 124. Thus, MDM system 104 includes computer-readable media. Computer-readable media includes, at least, two types of computer-readable media, namely computer-readable storage media and communications media.

Computer-readable storage media includes volatile and non-volatile, removable and non-removable media implemented in any method or technology for storage of information such as computer readable instructions, data structures, program modules, rule data, or other data. Computer-readable storage media, such as memory 124, include, but are not limited to, RAM, ROM, EEPROM, flash memory, cache memory, tightly coupled memory, other hardware memory technology, or any other non-transmission medium that can be used to store information for access by processors 122. Computer-readable storage media, such as storage devices 121 include, but are not limited to, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer-readable storage media does not include communication media.

Memory 124 includes, among other things, an enhanced MDM module 126. The enhanced MDM module 126 may process, analyze, store and manage utility data received from collection systems 102, mobile collection devices 118 as well as UDCDs 110. The enhanced MDM module 126 may include process/control module 128, storage module 130, validation module 132, estimation module 134, work item module 136, queue manager module 138 and access module 140. The modules may be stored in memory 124 and executed by the one or more processors 122.

Process/control module 128 processes and controls utility data imported via collection systems 102 from utility data collection devices 110. Process/control module 128 applies rules associated with channels of utility data received from a plurality of utility data collection devices 110, to determine processing requirements for each block of utility data and to direct blocks of utility data to various independent parallel processing pipelines that are associated with the determined processing requirements. As an example, process/control module 128 may act as a "traffic cop", to direct data blocks or groups of data blocks to appropriate pipelines for processing. Process/control module 128 may use data in data blocks, such as header information, or an absence of processing instructions, to determine how to direct data blocks to pipelines. This allows for blocks of imported utility data from a plurality of utility data collection devices to be processed in a parallel manner via the independent parallel processing pipelines, greatly reducing latency between the time of utility data import and availability of valid utility data across the plurality of utility data collection devices.

As an example, independent parallel processing pipelines may include a validation pipeline (e.g., for determining whether each data block entry is valid), an estimation pipeline (e.g., for estimating missing entries or replacements for outlier entries of a data block), and a work item pipeline (e.g., for automated or manual intervention when discrepancies of one or more data block entries are too large for automated estimation). In this example, results obtained from one or more of these independent parallel processing pipelines may feed back to process/control module 128 as part of a feedback loop for further processing, such as, redirection to another pipeline, storage module 130, queue manager module 138, access module 140, or the like.

Process/control module 128 may be configured to evaluate the various types of channels processed by MDM system 104, and pre-load rules suitable for processing the various types of channels. As an example, process/control module 128 constructs a hierarchy of rules in memory, such as memory 124, for applying to the various types of channels processed by MDM system 104. Memory 124 may include high speed memory, such as cache memory, or the like, for storing the rules. Thus, appropriate rules are immediately available for processing each of the variety of channels, as opposed to fetching appropriate rules or rule sets from storage, such as storage 121, on a channel by channel basis as different channels of utility data blocks are imported or received by MDM system 104.

Process/control module 128 may construct the rule hierarchy such that associated portions of the rule hierarchy are provided to, or accessible by, other modules of enhanced MDM module 126. As an example, process/control module 128 may construct the rule hierarchy such that associated portions of the rule hierarchy are provided to, or accessible by, validation modules 132, estimation modules 134 and work item modules 136, as well as other modules. As such, validation modules 132 may have immediate access to validation rules and estimation modules 134 may have immediate access to estimation rules for all channels processed by MDM module 126.

Process/control module 128 may also have immediate access to rules to determine selection of an appropriate pipeline for routing each imported data block of utility data, as well as rules to determine how to process responses or results received from other modules and/or pipelines. In an embodiment, based at least in part on the rules or the rule hierarchy, process/control module 128 may determine an estimation of validity or perform a quick check (e.g., determine if data is missing, determine if data does not appear logical or in expected ranges, determine if data has improper units of measure, etc.) for each imported data block and determine processing requirements for each imported data block based at least in part on the estimation of validity or quick check. In an embodiment, process/control module 128 may determine where to route or direct data blocks based on data associated with data blocks (e.g., data in a data block header, instructions in a data block, flag(s) of a data block, etc.), an absence of instructions in a data block or other signals provided by various modules that process data blocks. Thus, process/control module 128 may select a pipeline having the determined processing requirements for each imported data block and direct each imported data block to the selected pipeline for processing, as well as direct data blocks to appropriate locations (e.g., modules, pipelines) after pipeline processing. Latency is reduced because all required rules and rule sets are pre-loaded, and ready to be applied immediately for each imported channel.

Storage modules 130 may be configured to interface with one or more storage devices, such as storage 121. Storage modules 130 may be used to access rules for pre-loading by process/control module 128, validation modules 132, estimation modules 134, and the like, to process utility data. Storage modules 130 may also be used to configure and store utility data during various processing phases. Modules of enhanced MDM module 126 may use storage modules 130 at various phases of processing to store utility data in various states. Storage modules 130 may provide associated formatting of data to allow utility data users to know a state of stored utility data and to access formatted utility data.

Validation modules 132 may be configured to determine whether utility data is valid, and report a validation result associated with the utility data. Validation modules 132 may use channel dependent validation rules to implement validation processing. Validation modules 132 may implement or provide validation processing for one or more independent validation pipelines. As an example, validation modules 132 may work in conjunction with process/control module 128 to implement and/or operate a validation pipeline. Rules or other information in data blocks may be used for determining data blocks that appear to have data (e.g., data items) that are within expected ranges for selecting a validation pipeline for processing those data blocks using validation modules 132 to determine those blocks that are actually valid. Alternatively, or in addition to, process/control module 128 may direct initially imported data blocks to validation module(s) 132, and then redirect individual data blocks based on instructions provided by validation module(s) 132.

Estimation modules 134 may be configured to estimate utility data. The estimation modules 134 may use channel dependent estimation rules to perform estimation processing. As an example, estimation modules 134 may work in conjunction with process/control module 128 to implement and/or operate one or more independent estimation pipelines. Channel dependent rules may be used to determine blocks of utility data from a variety of channels that have missing data items (e.g., a number of missing data items below a missing item threshold) or data items that may be of questionable quality (e.g., data items not within expected ranges but within a pre-specified threshold of expected ranges) such that an estimation pipeline is selected where one or more of estimation modules 134 may estimate the missing and/or questionable data items. After estimation, data blocks may be directed to validation module(s) 132 for validation.

Work item modules 136 may be configured to perform work item processing to correct utility data that has discrepancies (e.g., a number of missing data items above a missing item threshold and/or data items that are outside of the pre-specified threshold of expected ranges) that are too large to safely correct automatically, such as via estimation. As an example, work item modules 136 may work in conjunction with process/control module 128 to implement and/or operate one or more independent work item pipelines. Blocks of utility data from a variety of channels that have data discrepancies that are too large to safely correct automatically may be directed to one or more of work item modules 136. Work item modules 136 may then determine whether automatic or manual intervention is required to correct data discrepancies. As an example, work item modules 136 may be configured to request that a utility data collection device retransmit a block of data to replace a block of data having discrepancies that are too large, or determine that the block of data will be queued for manual intervention. Validation, estimation and work item pipelines may act as multi-threaded processes for parallel processing of data blocks by validation modules 132, estimation modules 134 and work item modules 136, respectively.

As an example, a pipeline may either exist in a memory space of a single process or be persisted to storage (e.g., a database) to be regenerated by a different process to be worked on at some later point. As such, when data is imported from a source (e.g., collection system 102), a single instance of a pipeline may be created to handle a group of data blocks, such that the data blocks may be processed in parallel by multiple threads within that process. In general, the majority of data blocks may only require the step of validation by validation module(s) 132. However, data blocks that require additional processing (e.g., data blocks that are not initially validated) may require one or more additional processing steps. To prevent latency in seeing all the initial results and backups waiting for the small number of data blocks that need further processing, enhanced MDM module 126 may allow all the initial results (e.g., validated data blocks) to be persisted (e.g., available to a user immediately) while saving a 'state' of a pipeline in a database with only the data blocks that need further processing. Then, a different background process may regenerate the persisted pipeline from the original process (and other processes that were doing the same work on other data blocks) and gather up data that originally came in separate data blocks into optimally sized new data blocks for processing.

Queue manager modules 138 are configured to manage queue updates. Queue manager modules 138 may determine whether a data block flagged as valid data is appropriate for addition to a queue of available data. As an example, queue manager modules 138 may receive a block of data from a particular utility data collection device 110 that contains only 12 hours of data, when normally, a block of data from such a device should contain 24 hours of data. Queue manager modules 138 may determine that the particular utility data collection device 110 was just put into service 12 hours ago, and may update the queue of available data with the block of data. As another example, queue manager modules 138 may evaluate, based on analysis of channel data of various other collocated utility data collection devices 110, that there was a power outage or other disruption that prevented the collection of data covering a full 24 hours.

Access modules 140 may be configured to facilitate access to the queue of available utility data, other stored utility data, or to process control requests from a user of MDM system 104. Access modules 140 may allow a user to request an estimation or a validation of utility data, apply specified rules to data, modify rules, request a retransmission of utility data, or other control requests. Access modules 140 may allow for instructions to be incorporated with, or into, a data block to allow process/control module 128 to determine where to direct the data block. Access modules 140 may also allow a user to request current usage data, original utility data, intermediate processed utility data, historical utility data, or the like.

Example Utility Data Blocks

Figure 2:
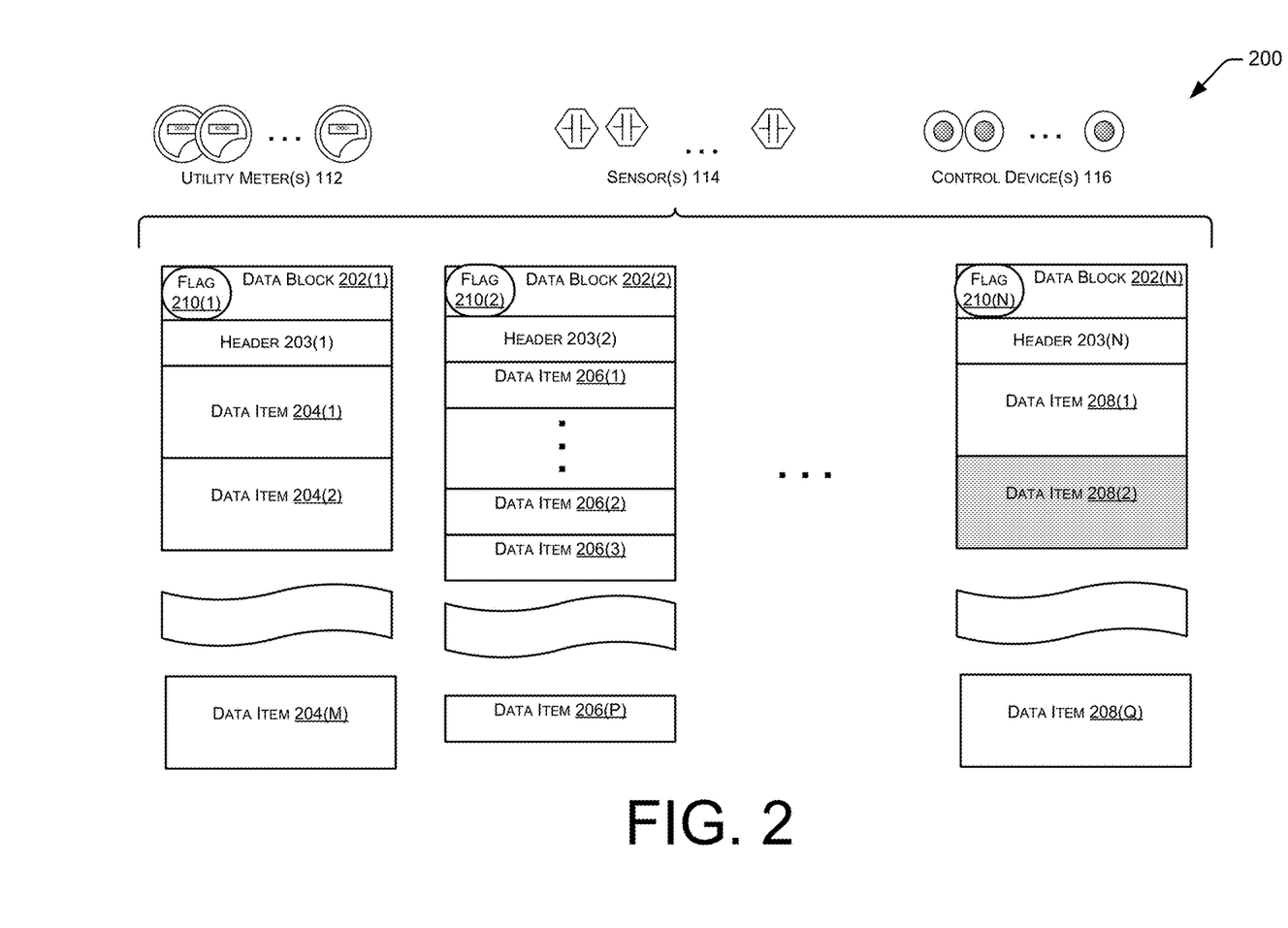
FIG. 2 is a diagram showing an example of data blocks containing data collected by utility data collection devices.

FIG. 2 is a diagram showing example data blocks 200 obtained from one or more of utility data collection devices 110. As described herein, data blocks 202(1)-202(N) from utility data collection devices 110 may be preprocessed by one or more of collection systems 102 or other collection devices 118. The example preprocessing may associate each of data blocks 202(1)-202(N) with header information 203(1)-203(N). Alternatively, one or more of utility data collection devices 110 may provide header information on their corresponding data blocks. The header information 203 may facilitate identifying a type, model, or other identifier of an associated utility data collection device 110. Such header information 203 may be utilized to identify a channel associated with each data block 202(1)-202(N).

Sample data block 202(1) includes data items 204(1)-204(M). As an example, data items 204(1)-204(M) include consumption information, such as a consumption of gas, water or electricity, as measured at periodic intervals by an associated utility meter 112. The M data items may indicate consumption over M intervals, such that data block 202(1) indicates consumption over a duration of time, such as an hour, day, month, or the like. As an example, data block 202(1) contains data collected by a particular utility data collection device.

Upon import of data block 202(1) by MDM system 104, enhanced MDM module 126 may flag data block 202(1) with a flag, such as flag 210(1). Process/control module 128 may initially analyze data block 202(1) (e.g., using rules specific to the channel of data block 202(1)) and may set flag 210(1) indicating that data block 202(1) may appear suitable for validation processing, and direct or route data block 202(1) to a validation pipeline. Alternatively, or additionally, process/control module 128 may use information in header 203 and/or flag 210 to direct or route data block 202(1) to a validation pipeline, or another pipeline or module. After validation processing, validation modules 132 or process/control module 128 may update flag 210(1) indicating whether data block 202(1) passed or failed validation by validation modules 132. Enhanced MDM module 126 may update flag 210(1) as data block 202(1) progresses through various states and/or pipelines. If data block 202(1) is ultimately determined to contain all required data items, and all of its data items are determined to be valid, enhanced MDM module 126 may update flag 210(1) or other information in header 203 to indicate that data block 202(1) is valid. In an embodiment, further downstream processing of data block 202(1) may occur, such as by queue manager modules 138, to determine whether data block 202(1) is available valid data. As such, flag 210(1) may be updated indicating that data block 202(1) is available valid data. In an alternate embodiment, flag 210(1) may be optional, or flag 210(1) may be of a complex or compound design that may be updated at various states, and not be updated at various other states of data block 202(1) processing.

Example data block 202(2) is shown in FIG. 2 to have data items 206(1)-206(P), which may be formatted data that relate to or include individual readings of data collected from a utility data collection device. Example data block 202(2) has data items missing between data items 206(1) and 206(2) which may be discovered by channel specific rules when data block 202(2) is imported at MDM module 126, and/or after a failed validation processing attempt. As an example, process/control module 128 may direct data block 202(2) to validation module(s) 132 to determine that data block 202(2) has missing data, and route or direct data block 202(2) to an estimation pipeline for estimation of missing data items by estimation modules 134. Process/control module 128 or estimation module 134 may then direct data block 202(2) to a validation pipeline. Process/control module 128, validation module 132 or estimation module 134 may set flag 210(2) indicating whether estimates provided by estimation modules 134 were valid, and/or whether data block 202(2) as a whole is valid or not. Process/control module 128 may be configured to determine or detect that too much data is missing, such that the missing data items are above a missing item threshold, and request retransmission of the data block, or forward data block 202(2) to a work item pipeline for processing by work item modules 136. Process/control module 128 may be configured to determine where to direct data block 202(2) based on instructions in data block 202(2) incorporated after processing by validation module(s) 132, estimation module(s) 134, work item module(s) 136, access module(s) 140, and/or other modules.

Example data block 202(N) is shown in FIG. 2 to have data items 208(1)-208(Q), which relate to or include individual readings of data collected from a utility data collection device. Example data block 202(N) is shown in FIG. 2 such that enhanced MDM module 126 has determined that data item 208(2) is not within expected ranges. FIG. 2 shows that only one data item is not within expected ranges. However, multiple data items could potentially be outside of expected ranges. In an embodiment, process/control module 128 may determine whether data item 208(2) is within a specified threshold (e.g., pre-specified threshold) suitable for attempting estimation. If process/control module 128 determines that data item 208(2) is within the specified threshold suitable for attempting estimation, then process/control module 128 may direct data block 202(N) to an estimation pipeline. Alternately, if process/control module 128 determines that data item 208(2) is not within the specified threshold suitable for estimation, then process/control module 128 may direct data block 202(N) to a work item pipeline. Process/control module 128 may be configured to determine a status of data block 202(N) and determine where to direct data block 202(N) based on instructions in data block 202(N) incorporated after processing by validation module(s) 132, estimation module(s) 134, work item module(s) 136, access module(s) 140, and/or other modules. Flag 210(N) may be set indicating a status of data block 202(N).

Example Enhanced MDM Module Processing

Figure 3:
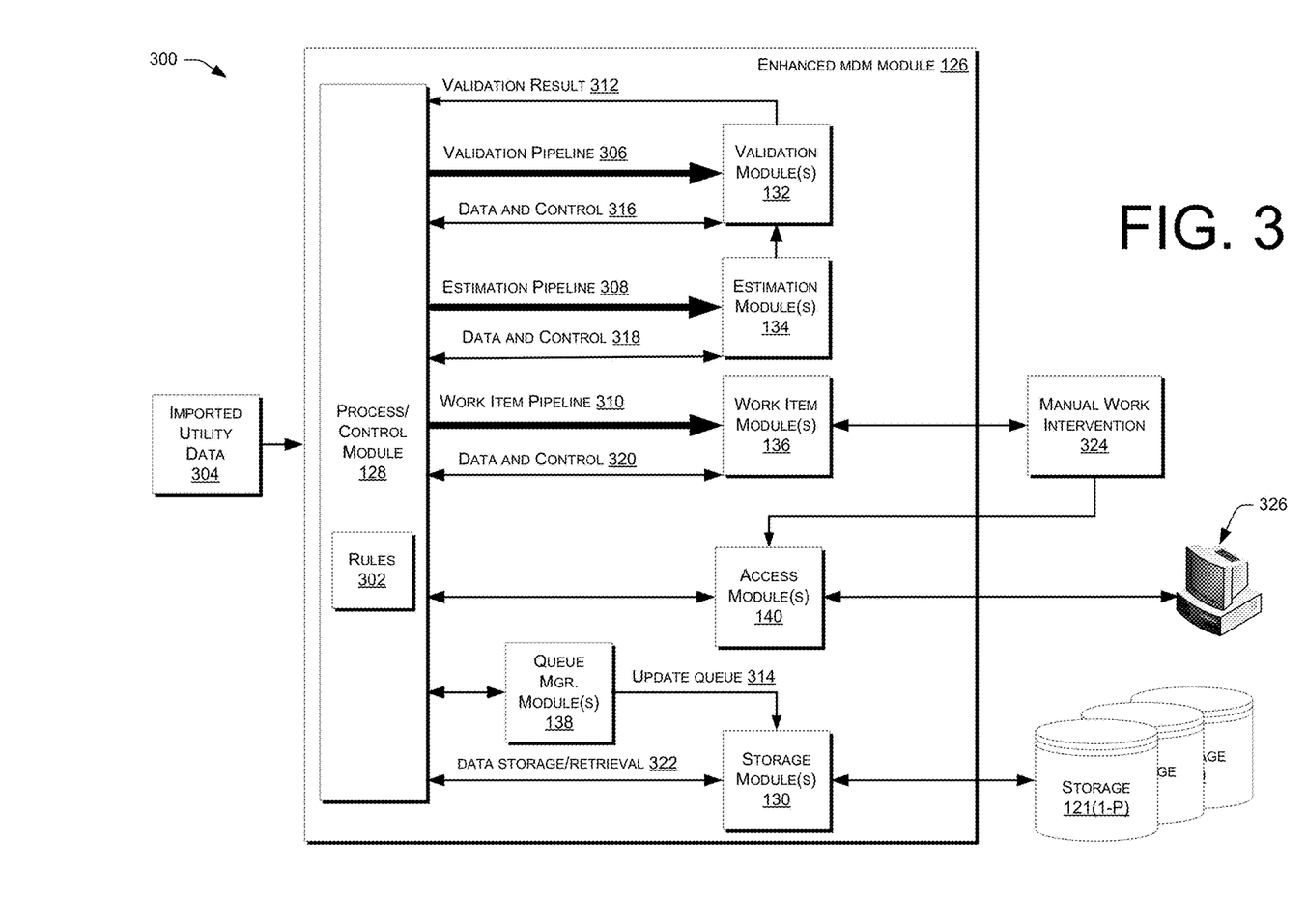
FIG. 3 is a schematic diagram showing an example architecture of an enhanced MDM system.

FIG. 3 is an example environment 300 illustrating an example of enhanced MDM processing. As discussed herein, enhanced MDM module 126 evaluates the various types of channels processed by MDM system 104, and pre-loads an aggregation of rules 302, such as a rule hierarchy, suitable for processing the various types of channels.

Enhanced MDM module 126 receives and/or imports a plurality of data blocks 304 containing data that may have been collected from a plurality of utility data collection devices 110. As an example, data 304 includes data blocks 202(1)-202(N) in FIG. 2. As an example, upon initial import of data blocks, process/control module 128 may use rules 302 to direct the initially imported data blocks to validation pipeline 306 for validation processing by validation module(s) 132. As an example, multiple threads may be used to process each of initially imported data blocks 304 in parallel and in line within a validation pipeline 306 process. Validation module(s) 132 may then tag or provide information in each processed data block 304 (e.g., via flags 210, validation result 312) to allow process/control module 128 to determine where to direct data blocks to after validation processing. As an example, a first set of data blocks that did not pass initial validation but appear suitable for estimation may be grouped and directed by process/control module 128 to estimation pipeline 308. Those first set of data blocks may then be processed in parallel by multiple threads out of line within an estimation pipeline 308 process. The first set of data blocks may include data blocks from a current import as well as data blocks from a previous import. A second set of data blocks that did not pass initial validation and did not appear suitable for estimation may be grouped and directed by process/control module 128 to work item pipeline 310. Those second set of data blocks may then be processed in parallel by multiple threads out of line within a work item pipeline 310 process.

As an example, validation module(s) 132, estimation modules 134 and work item modules 136 may apply one or more rules 302, which may be stored in memory 124 (see FIG. 1). The rules 302 may be configured in a hierarchy, and may be appropriate for operation on one or more channels associated with each of the data blocks. In the example environment shown in FIG. 3, process/control module 128 determines, based at least in part on rules 302 and/or information in data blocks (e.g., flags 210), an appropriate pipeline for each of the data blocks 304 associated with a current import of data blocks as well as data blocks from other imports. Process/control module 128 then directs each data block 304 to a determined pipeline, such as validation pipeline 306, estimation pipeline 308 and work item pipeline 310. In an embodiment, process/control module 128 may use rules 302 to determine an estimation of validity or perform a quick check (e.g., determine if data is missing, determine if data does not appear logical or in expected ranges, determine if data has improper units of measure, etc.) for each data block 304 to determine an appropriate pipeline for processing each of the data blocks 304.

Thus, enhanced MDM module 126 uses pipelines 306-310 to process data collected from a plurality of utility data collection devices 110 in a parallel manner. As such, process/control module 128 directs each of a plurality of received data blocks 304 to an appropriate pipeline for parallel processing by modules associated with each of the individual pipelines. As an example, process/control module 128 does not operate in a sequential fashion, such that it is not required to wait for part or all of processing of any data block in a pipeline to conclude before directing another data block to an appropriate pipeline for processing.

As an example, process/control module 128 imports a data block (e.g., data block 202(1) of FIG. 2), determines a channel associated with data block 202(1) (e.g., by decoding and/or mapping data in the header), and applies data block 202(1) to an entry point in the pre-loaded rule hierarchy 302 associated with the channel of data block 202(1). Using channel specific rules, process/control module 128 may determine that no data items appear to be missing in data block 202(1), and that data items 204(1)-204(M) appear to be within expected ranges. Alternatively, or additionally, process/control module 128 directs data block 202(1) to validation pipeline 306 for processing by validation modules 132. Validation modules 132 may be configured to apply validation rules in rules 302 to data block 202(1) and provide a validation result 312 (e.g., information in flag 210(1)) to process/control module 128. Flag 210(1) may be set at various states by modules of enhanced MDM module 126 indicating a current status of data block 202(1). As an example, validation result 312 of data block 202(1) may be passed to process/control module 128. The validation result 312 may be separate data or an indication set in flag 210(1) as provided by, for example, validation modules 132.

If validation result 312 indicates that data block 202(1) is valid, process/control module 128 may pass data block 202(1) to queue manager modules 138 to update queue 314. In an embodiment, if validation result 312 indicates that data block 202(1) is not valid, process/control module 128 may apply rules 302 to determine whether data block 202(1) is directed to estimation pipeline 308 or work item pipeline 310. Alternatively, or additionally, process/control module 128 may use information in flag 210(1) and/or validation result 312 to determine where to direct data block 202(1) to.

Upon initial import of data block 202(1), and at any point in the processing of data block 202(1), as well as any other data block, modules of enhanced MDM module 126 may send a copy of the data block, with a flag indicating a current status, to storage modules 130 or queue manager modules 138 for storing in storage 121(1-P). As an example, modules of enhanced MDM module 126 may use connections 316-322, queue manager module 138, and/or other direct or indirect connections (not shown) to send a current copy of a data block to storage modules 130 for formatting and storage in storage 121(1-P). Additionally, process/control module 128 may use information provided by a user (e.g., via flag 210) to determine where to direct a data block to. As an example, as a part of work item processing, a user may configure special estimation or validation rules for a data block, and provide instructions in the data block to instruct process/control module 128 to direct the data block to estimation pipeline 308 or validation pipeline 306.

As another example, process/control module 128 imports a data block, such as data block 202(2) in FIG. 2, determines a channel associated with data block 202(2), and applies data block 202(2) to an entry point in the pre-loaded rule hierarchy 302 associated with the channel of data block 202(2). In this example, process/control module 128 determines that data items are missing in data block 202(2), that the missing data items will not hinder estimation (e.g., not too many missing items to be suitable for estimation) and that data items 206(1)-206(P) are within expected ranges or within a specified threshold suitable for estimation. Alternatively, or additionally, process/control module 128 may direct data block 202(2) to validation pipeline 306, and use validation result 312 to determine that data items 206(1)-206(P) are within expected ranges or within a specified threshold suitable for estimation. Thus, process/control module 128 directs data block 202(2) to estimation pipeline 308 for processing by estimation modules 134 to estimate the missing data items. Estimation modules 134 may be configured to apply estimation channel specific rules in rules 302 to data block 202(2) based on the channel associated with data block 202(2). After estimation is complete, estimation modules 134 may direct data block 202(2) to validation modules 132 for revalidation. Alternatively, or additionally, estimation modules 134 may pass data block 202(2) to process/control module 128 for directing to validation pipeline 306 for revalidation. Thus, validation modules 132 may provide a validation result 312, directly or indirectly, to process/control module 128. Flag 210(2) may be set at various states by modules of enhanced MDM module 126 indicating a current status of data block 202(2). If a data block fails revalidation, enhanced MDM module 126 may not attempt another estimation, and process/control module 128 may not direct the same data block to estimation pipeline 308 more than once unless specifically directed to do so.

If a data block 202(2) has missing data, the missing data may arrive at a later time. In an embodiment, even though the missing data may have been previously estimated and validated, missing data that arrives may be incorporated into data block 202(2) to create a new data block 202(2), and process/control module 128 may apply rules 302 to the new data block 202(2) and use it to update the queue if new data block 202(2) is determined to be valid. Alternatively, or additionally, process/control module 128 may direct new data block 202(2) to validation pipeline 306, and use validation result 312 to determine if new data block 202(2) is valid before updating the queue.

As another example, process/control module 128 may import a data block, such as data block 202(N) of FIG. 2, determine a channel of data block 202(N), and apply or direct data block 202(N) to an entry point in the pre-loaded rule hierarchy 302 associated with the channel of data block 202(N) where rule processing is performed on data block 202(N). In this example, process/control module 128 may determine that at least a portion of data item 208(2) is not within expected ranges. If process/control module 128 determines that data item 208(2), that is not within expected ranges, is within a specified threshold indicating that the data is suitable for estimation, then process/control module 128 may direct the data block 202(N) to estimation pipeline 308 for processing by estimation modules 134 as described herein. However, if process/control module 128 determines that data item 208(2) is not within a specified threshold indicating that it is suitable for estimation, process/control module 128 may direct data block 202(N) to work item pipeline 310 for processing by work item modules 136. Alternatively, or additionally, process/control module 128 may direct data block 202(N) to validation pipeline 306, and use validation result 312 to determine whether to direct data block 202(N) to estimation pipeline 308 or work item pipeline 310.

Work item modules 136 may determine that means other than estimation of data items are required to resolve issues with data block 202(N). As an example, work item modules 136 may request retransmission of data block 202(N), verify that data block 202(N) was processed using correct rules or rule set(s), automatically check other configuration parameters, direct reprocessing of data block 202(N), or the like. If work item modules 136 resolve issues with data block 202(N), process/control module 128 may reprocess data block 202(N) by re-applying rules 302 to data block 202(N) and redirecting data block 202(N) to an associated pipeline, such as validation pipeline 306.

If work item modules 136 cannot resolve issues with data block 202(N), data block 202(N) may be passed to block 324 for manual intervention, such as by a human operator or work group. As an example, manual intervention 324 may include a request for retransmission of data block 202(N), a request for estimation or re-estimation of data block 202(N), resolve an issue to correct system configuration parameters (e.g., correct parameters associated with units of measurement used for data block 202(N)), a change or reassignment of rules for processing data block 202(N), a manual entry of data, other manual interventions, or the like. Manual work intervention 324 may provide data, results, commands, control, or the like, directly or indirectly, to process/control module 128 for action or notification purposes. If manual work intervention 324 resolves issues with data block 202(N), process/control module 128 may reprocess data block 202(N) by re-applying rules 302 to data block 202(N) and redirecting data block 202(N) to an associated pipeline (e.g., validation pipeline 306). Similarly, a user of terminal 326 may provide data, results, commands, control, or the like, to process/control module 128 via access modules 140.

Process/control module 128 may automatically integrate data, results, commands, control, or the like, from manual work intervention 324 or terminal 326. Process/control module 128 may direct an updated data block 202(N) to estimation pipeline 308 or validation pipeline 306 as directed by manual work intervention 324 or terminal 326.

As an example, upon initial import of a group of data blocks (e.g., data blocks 202(1)-202(N)), process/control module 128 may direct the group of data blocks to validation pipeline 306, such that validation processing is performed on the group of data blocks in parallel and in line. As such, each data block of the group may be processed in parallel and in line by multiple threads within the validation pipeline process. In general, a majority of the data blocks will pass validation, and process/control module 128 will direct those validated data blocks to queue manager module(s) 138 to update queue 314 such that the validated data blocks are immediately available for usage. For data blocks that may fail validation, process/control module 128 may process those data blocks in parallel by directing them to appropriate pipelines, where parallel processing may be done out of line, since different un-validated data blocks may require different types of pipeline processing. As an example, a first set of data blocks that fail validation may be processed in parallel by multiple threads within an estimation process (e.g., in an estimation pipeline) followed by parallel processing by multiple threads within a validation process (e.g., in a validation pipeline), while a second set of data blocks that fail validation may be processed in parallel by multiple threads within a work item process (e.g., in a work item pipeline) followed by parallel processing by multiple threads within a validation process (e.g., in a validation pipeline). Additionally, data blocks that are not part of the initial import of the group of data blocks may be received by process/control module 128 and processed in parallel, for example, by validation pipeline 306 and/or estimation pipeline 308.

Example Methods of Operation

Figure 4:
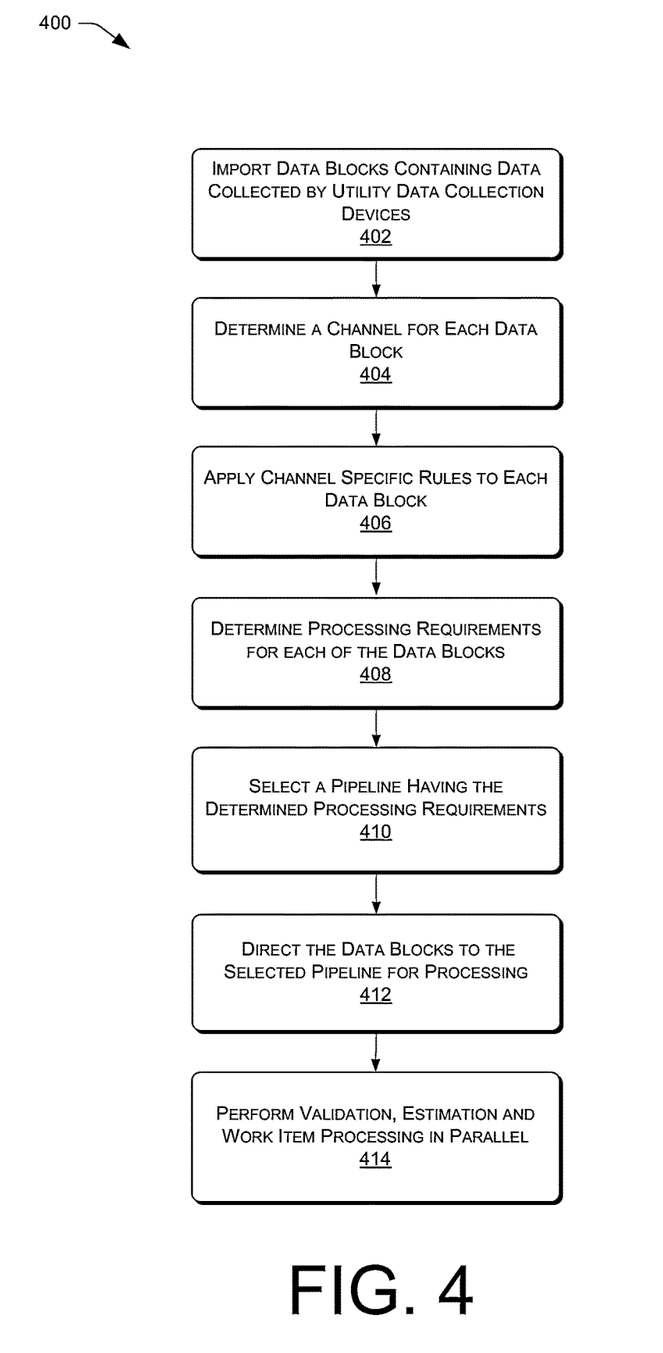
FIG. 4 illustrates an example method implemented by an enhanced MDM system.

FIG. 4 illustrates an example method 400 of enhanced MDM processing. Method 400 is described with reference to the example architecture 100 of FIG. 1 for convenience. However, method 400 is not limited to use with the example architecture 100 of FIG. 1 and may be implemented using other architectures and devices. A goal of method 400 may be to verify data blocks that are valid and generate valid data blocks for data blocks that are not valid.

At block 402, data blocks containing data collected by utility data collection devices are imported. For example, data blocks containing data collected by utility data collection devices 110 are imported by MDM system 104 for processing by MDM module 126. The data blocks may be generated or formatted by a collection system 102 (and/or mobile collection system 118) to contain data items associated with interval or other readings collected by utility data collection devices over certain measurement periods. Thus, a data block may include data collected by a utility data collection device over a certain specified or pre-determined measurement period. Utility data collection devices may include gas consumption meters, water consumption meters electricity consumption meters, utility meters, sensors and/or control devices.

At block 404, a channel for each of the data blocks is determined. For example, enhanced MDM module 126 may extract channel information from header 203 to determine a channel for each data block, or determine a channel of each data block by other means.

At block 406, channel specific rules are applied to each data block. Thus, when a channel is determined for a data block, the rules, such as rules 302, may be configured to be associated with various channels. Therefore, rules specific to the determined channel of the data block may be applied to the data block by enhanced MDM module 126.

At block 408, processing requirements are determined for each of the data blocks by enhanced MDM module 126. Channel specific rules applied to data blocks may be used for determining the processing requirements of each of the data blocks. The rules may be configured in a rule hierarchy. The rule hierarchy may have entry points, such that each entry point is associated with one or more channels of data blocks. Thus, a data block of a particular channel may be applied to an entry point of the rule hierarchy associated with the same channel to apply rules to the data block to determine the processing requirements for the data block. As an example, rules may be applied to a group of initially imported data blocks of a variety of channels in parallel by directing the initially imported data blocks in line to multiple parallel threads of validation pipeline 306 where channel specific rules are used.

At block 410, a pipeline is selected having the determined processing requirements for each of the data blocks. Rules associated with channels of each data block and/or information contained in each data block may be used to determine those data blocks that may require validation processing, estimation processing or work item processing. Thus, for a plurality of imported data blocks, enhanced MDM module 126 may use channel specific rules 302 to select validation pipeline 306, estimation pipeline 308 or work item pipeline 310 for each data block of the plurality of imported data blocks 304.

At block 412, each of the data blocks are directed to the selected pipeline for processing. As an example, for each of a plurality of imported data blocks, enhanced MDM module 126 may direct a first subset of the plurality of data blocks to a validation pipeline where the processing includes validation processing, a second subset of the plurality of data blocks to an estimation pipeline where the processing includes estimation processing or a third subset of the plurality of data blocks to a work item pipeline where the processing includes work item processing. As another example, enhanced MDM module 126 may direct each of a plurality of imported data blocks in line and in parallel to a validation pipeline for processing in parallel by multiple threads within a validation pipeline 306 process. An outcome of validation pipeline processing may determine where data blocks are directed to next.

At block 414, the processing of the data blocks directed to the validation pipeline, the estimation pipeline and the work item pipeline occurs in parallel. As such, the validation pipeline, the estimation pipeline and the work item pipeline operate independently and in parallel and the validation processing, the estimation processing and the work item processing execute in parallel for the processing of the data blocks. Data blocks may include instructions or other data indicating whether they are to be processed in parallel by the validation pipeline 306, the estimation pipeline 308, the work item pipeline 310 or be sent to queue manager module 138.

As an example of method 400, for the data blocks that have data items that appear to be within expected ranges, the selected pipeline is a validation pipeline, where the processing at block 412 determines whether those data blocks that have data items that are within expected ranges are valid data blocks. For the data blocks that have missing data items and/or data items that are not within expected ranges but within a pre-specified threshold of expected ranges, the selected pipeline is an estimation pipeline, where the processing estimates those data items that are missing and/or estimates those data items that are not within expected ranges but are within a pre-specified threshold of expected ranges. For the data blocks that have a number of missing data items above a missing item threshold and/or data items that are outside of the pre-specified threshold of expected ranges, the selected pipeline is a work item pipeline, where the processing resolves the data blocks that have a number of missing data items above the missing item threshold and/or data items that are outside of the pre-specified threshold of expected ranges.

Additionally, at least a subset of channel specific validation rules may be used to determine which pipeline to select. As an example, initially imported data blocks may be directed to validation pipeline 306, which then determines where each data block should be directed to next. However, there may exist functionality that differs from initial import processing of data blocks that may be invoked, for example, when a user is trying to 'work an issue'. As such, a user may insert explicit 'instructions' into a data block, such as a specific pipeline to be directed to, rather than making a determination by analysis of the data block itself. As an example, a user may direct that a data block be sent to an estimation pipeline after possibly adjusting estimation rules or after new historical data has come in that is associated with a data block. Such a data block may be processed with other data blocks in a parallel out of line fashion in the estimation pipeline relative to, for example, parallel processing of newly imported data blocks being processed in parallel in an in line fashion by, for example, validation pipeline 306.

CONCLUSION

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method implemented by a meter data management (MDM) system, the method comprising:
under control of one or more processors configured with executable instructions:
collecting, by a process/control module, data that was obtained from a plurality of utility data collection devices, wherein the collecting comprises importing data blocks containing i) header information identifying a type or model of individual ones of the plurality of utility data collection devices and ii) the collected data that was collected by the plurality of the utility data collection devices;
determining processing requirements for each of the data blocks, based at least in part on a channel used by each respective data block;
selecting a pipeline to use to process each data block based on the type or model information identified by the header information of the respective data block, the pipeline being selected from among a group of pipelines including a validation pipeline where the processing includes validation processing, an estimation pipeline where the processing includes estimation processing, and a work item pipeline where the processing includes work item processing;

directing the data blocks to the selected pipeline for processing, the directing comprising sending the data blocks directly from the process/control module to at least one of the validation pipeline, the estimation pipeline, or the work item pipeline;

directing processed data blocks to the process/control module; and directing the processed data blocks from the process/control module to a queue of available valid data suitable for analysis and for billing purposes.

2. The method of claim 1, wherein the validation pipeline, the estimation pipeline and the work item pipeline operate independently and in parallel.

3. The method of claim 1, wherein the processing of the data blocks directed to the validation pipeline, the estimation pipeline and the work item pipeline occurs in parallel.

4. The method of claim 1, further comprising, based at least in part on the processing:
verifying data blocks that are valid; and
generating valid data blocks for data blocks that are not valid.

5. The method of claim 1, wherein the utility data collection devices include at least one of a gas consumption meter, a water consumption meter or an electricity consumption meter.

6. The method of claim 1, wherein the utility data collection devices include utility meters, sensors and control devices.

7. The method of claim 1, further comprising:
applying rules to each of the data blocks, wherein application of the rules is based on a channel determined for use by each of the data blocks and is not based on individualized analysis of each data block.

8. The method of claim 1, wherein the determining the processing requirements for each of the data blocks is based at least in part on rules applied to each of the data blocks.

9. The method of claim 1, wherein determining processing requirements for each of the data blocks is based at least in part on processing the data blocks using a rule hierarchy.

10. The method of claim 9, further comprising:
sending each of the data blocks to an entry point in the rule hierarchy.

11. The method of claim 1, wherein:
for the data blocks that have data items that are within expected ranges, the selected pipeline is a validation pipeline, wherein the processing determines whether those data blocks that have data items that are within expected ranges are valid data blocks;
for the data blocks that have missing data items and/or data items that are not within expected ranges but within a pre-specified threshold, the selected pipeline is an estimation pipeline, wherein the processing estimates those data items that are missing and/or estimates those data items that are not within expected ranges but are within a pre-specified threshold; and
for the data blocks that have a number of missing data items above a missing item threshold and/or data items that are outside of the pre-specified threshold, the selected pipeline is a work item pipeline, wherein the processing resolves the data blocks that have a number of missing data items above the missing item threshold and/or data items that are outside of the pre-specified threshold.

12. The method of claim 1, wherein the selected pipeline for processing comprises the estimation pipeline, and wherein the MDM system further comprises an estimation module that receives data blocks based on a quality of the data.

13. A meter data management (MDM) system comprising:
memory;
at least one processor in communication with the memory;
pipelines that operate independently and in parallel;
a process/control module resident in the memory and executable by the at least one processor, the process/control module configured to:
import data blocks containing data collected by utility data collection devices and header information identifying a type or a model of individual ones of the utility data collection devices;
determine processing requirements for each of the data blocks, based at least in part on a channel used by each respective data block;
select one of the pipelines to use to process each data block based on the type or model information identified by the header information of the respective data block;
direct the data blocks to the selected one of the pipelines directly from the process/control module for processing;
receive processed data blocks; and
direct the processed data blocks to a queue manager module; and
an access module configured to:
incorporate instructions with one or more of the imported data blocks, wherein the instructions identify for the process/control module where to direct each data block; and
process requests for current usage data, original utility data, intermediate processed utility data and historical utility data.

14. The system of claim 13, wherein the pipelines include a validation pipeline where the processing comprises validation processing, an estimation pipeline where the processing comprises estimation processing and a work item pipeline where the processing comprises work item processing.

15. The system of claim 14, the system further comprising:
a validation module, executable by the at least one processor, to perform the validation processing of the data blocks directed to the validation pipeline;
an estimation module, executable by the at least one processor, to perform the estimation processing of the data blocks directed to the estimation pipeline; and
a work item module, executable by the at least one processor, to perform the work item processing of the data blocks directed to the work item pipeline; wherein the validation module, the estimation module and the work item module execute in parallel.

16. One or more computer-readable storage media storing instructions that, when executed by one or more processors, perform acts comprising:
evaluating multiple types of channels processed by a meter data management system;
pre-loading rules suitable for processing the multiple types of channels according to the evaluation;

constructing a hierarchy of rules from among the preloaded rules;
importing, by a process/control module, data blocks containing utility data collected by utility data collection devices and header information identifying a type or model associated with individual ones of the utility data collection devices;
determining processing requirements for each of the data blocks, wherein the processing requirements are based at least in part on a channel used by each respective data block;
selecting a pipeline to use to process each data block based on the type or model information identified by the header information of the respective data block, wherein the pipeline is selected from multiple pipelines that operate independently and in parallel, and wherein the pipeline is selected based at least in part on the hierarchy of rules;
directing the data blocks to the selected pipeline for processing; and
directing processed data blocks to the process/control module.

17. The one or more computer-readable storage media of claim 16, wherein the multiple pipelines include a validation pipeline where the processing comprises validation processing, an estimation pipeline where the processing comprises estimation processing and a work item pipeline where the processing comprises work item processing.

18. The one or more computer-readable storage media of claim 17, wherein the validation processing, the estimation processing and the work item processing execute in parallel for the processing of the data blocks.

19. The one or more computer-readable storage media of claim 16, wherein the multiple pipelines include a validation pipeline where the processing comprises validation processing, an estimation pipeline where the processing comprises estimation processing, and a work item pipeline where the processing comprises work item processing, the selected pipeline for processing comprises the estimation pipeline, the validation processing, the estimation processing and the work item processing execute in parallel for the processing of the data blocks, and responsive to the processing comprising estimation processing, after the estimation processing is complete, the data blocks are directed to a validation module for validation processing.

20. The one or more computer-readable storage media of claim 16, wherein the data blocks are directed toward either an estimation pipeline where the processing comprises estimation processing or a work item pipeline where the processing comprises work item processing.

* * * * *